(12) United States Patent
Slavin

(10) Patent No.: US 7,346,162 B2
(45) Date of Patent: Mar. 18, 2008

(54) PUBLIC KEY CRYPTOGRAPHY USING MATRICES

(75) Inventor: Keith R Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 19 days.

(21) Appl. No.: 11/493,199

(22) Filed: Jul. 26, 2006

(65) Prior Publication Data

US 2008/0037774 A1    Feb. 14, 2008

Related U.S. Application Data

(62) Division of application No. 10/260,818, filed on Sep. 30, 2002, now Pat. No. 7,184,551.

(51) Int. Cl.
*H04L 9/00* (2006.01)

(52) U.S. Cl. .............. 380/30; 380/44; 380/255; 713/170; 713/182; 713/189

(58) Field of Classification Search ............. 380/30, 380/44, 255; 713/170, 182, 189
See application file for complete search history.

(56) References Cited

U.S. PATENT DOCUMENTS

| | | | |
|---|---|---|---|
| 3,657,476 A | | 4/1972 | Aiken |
| 4,218,582 A | * | 8/1980 | Hellman et al. ............ 380/30 |
| 4,405,829 A | | 9/1983 | Rivest et al. |
| 4,658,094 A | | 4/1987 | Clark |
| 4,891,781 A | | 1/1990 | Omura |
| 4,972,474 A | | 11/1990 | Sabin |
| 5,210,710 A | | 5/1993 | Omura |
| 5,289,397 A | | 2/1994 | Clark et al. |
| 5,577,209 A | | 11/1996 | Boyle et al. |

(Continued)

OTHER PUBLICATIONS

Flannery et al, "In Code: A mathematical Journey—Appendix A", Workman Publishing, 2001, pp. 271-296.*
Hughes, James, "A linear Algebraic Attack on the AAFGI Braid Group Cryptosystem", Springer, 2002, pp. 176-189.*

(Continued)

*Primary Examiner*—Nasser Moazzami
*Assistant Examiner*—Shanto M Z Abedin
(74) *Attorney, Agent, or Firm*—Schwegman, Lundberg & Woessner, P.A.

(57) ABSTRACT

The invention provides techniques for secure messages transmission using a public key system to exchange secret keys. A first entity creates public and private keys by generating a product n of two large, randomly chosen prime numbers, and then generating random matrices {A, C}, in the group $GL(r, Z_n)$ with a chosen matrix rank r such that AC is not equal to CA, and then generating a matrix B=CAC, and finding a matrix G that commutes with C. Matrices A, B, G and the integers n and r are then published as the public key and matrix C is then kept as the private key. A second entity then obtains the public key and calculates a secret matrix D that commutes with G, and further calculates the matrices K=DBD and E=DAD. The message to be sent is then encrypted using matrix K as the secret key and then sent to the first entity with matrix E. First entity then retrieves secret matrix K using K=CEC and then decrypts the received encrypted message using the retrieved secret matrix K.

12 Claims, 5 Drawing Sheets

U.S. PATENT DOCUMENTS

| | | |
|---|---|---|
| 5,692,124 A | 11/1997 | Holden et al. |
| 5,802,178 A | 9/1998 | Holden et al. |
| 5,828,832 A | 10/1998 | Holden et al. |
| 5,832,228 A | 11/1998 | Holden et al. |
| 5,940,591 A | 8/1999 | Boyle et al. |
| 5,956,407 A | 9/1999 | Slavin |
| 5,974,151 A | 10/1999 | Slavin |
| 6,067,620 A | 5/2000 | Holden et al. |
| 6,081,597 A | 6/2000 | Hoffstein et al. |
| 6,272,538 B1 | 8/2001 | Holden et al. |
| 6,272,639 B1 | 8/2001 | Holden et al. |
| 6,298,137 B1 * | 10/2001 | Hoffstein et al. ............. 380/30 |
| 6,442,600 B1 | 8/2002 | Anderson |
| 6,459,791 B1 | 10/2002 | M'Raihi et al. |
| 6,493,449 B2 * | 12/2002 | Anshel et al. ................ 380/30 |
| 6,643,698 B2 | 11/2003 | Holden et al. |
| 6,956,947 B2 | 10/2005 | Benaloh |
| 6,986,045 B2 * | 1/2006 | Campagna .................. 713/170 |
| 7,136,484 B1 * | 11/2006 | Koh ............................ 380/28 |

OTHER PUBLICATIONS

Rocha et al, "Cryptanalysis of Krouk's Public- Key Cipher", *Electronics Letters*, Jul. 1996, pp. 1279-1280.*

Flannery, et al., "In Code: A Mathematical Journey—Appendix A", *In code: A Mathematical Journey*, Workman Publishing,(2001), 271-296.

Maze, G., et al., "Public Key Cryptography based on Simple Modules over Simple Rings", (Jun. 26, 2002),1-8.

Ourivski, A. V., et al., "New Technique for Decoding Codes In the Rank Metric and Its Cryptography Applications", *Problem of Information Transmission*, 38(3), (2002),237-246.

Sun, H.-M., "Cryptanalysis of a Public-Key Cryptosystem Based on Generalized Inverses of Matrices", *IEEE Communications Letters*, 5(2), (Feb. 2001), 61-63.

WU, C. K., "Generalised Inverses in Public Key Cryptosystem Design", *IEE Proceedings*, 145(5), (Sep. 1998), 321-326.

* cited by examiner

PUBLIC KEY CRYPTOGRAPHY USING MATRICES

RELATED APPLICATIONS

This application is a Divisional of U.S. application Ser. No. 10/260,818, filed Sep. 30, 2002 now U.S. Pat. No. 7,184,551, which is incorporated herein by reference.

FIELD OF THE INVENTION

The present invention relates to data communications, and more particularly to cryptography for secure data transmission.

BACKGROUND OF THE INVENTION

Electronic messages are generally transmitted between remote correspondents via a communications system typically including a network of interconnected computers. Such messages are readily intercepted and viewed by others using the network. Thus, correspondents desiring privacy may encrypt or encode a message such that only the recipient can decrypt or decode the message to view the contents.

In a public key encryption system, a person wishing to receive encrypted messages (a potential recipient) is able to generate a special set of numeric values. Some of these numeric values are published by the recipient as a public key and the remaining numeric values are kept as the recipient's private key. A second person (a sender) wishing to send an encrypted message to the recipient, first obtains the recipient's public key, and then encrypts a message using this public key information. The message is then sent to the recipient. The recipient is then able to use his or her private key information to decrypt the encrypted message much more rapidly than a message eavesdropper who does not have the private key information. In all public key schemes known, there is a mathematical relationship between the private key and the public key. Finding the private key via the mathematical relationship can be made arbitrarily difficult at the expense of encryption and/or decryption performance.

A well-known encryption technique is disclosed in U.S. Pat. No. 4,405,829 to Rivest et al., which is incorporated by reference. The technique is also known as the RSA public key system. The RSA algorithm performs integer arithmetic modulo n, where n is a product of two large, randomly chosen prime numbers. A recipient generates a private exponent key using knowledge of the prime factors and a chosen public exponent. The public exponent and modulus n is published as the public key. The message sender uses the public key information to break up messages into pieces, each of which is numerically encoded in an agreed-on format to lie in the modulus range. The sender then takes each piece of the message as a numeric value and raises it to the public exponent, with the result calculated as modulo n. The result of encoding each piece is an encrypted value.

The above-described "power-mod" process is generally fast for small powers, so public exponents, tend to be relatively small compared to n. The sender then packs all the values in an agreed-on format to form the encrypted message. The recipient takes the message and breaks it up into the same sets of encrypted values modulo n. For each value, the recipient raises the encrypted message to their private exponent modulo n. This results in using the power-mod function again. Each resulting value is then unpacked to reclaim the original encrypted message.

To ensure security, n must be chosen so that factorization into its prime factors is not feasible using the fastest known algorithms. If n's factors can be found, then the private exponent can be easily calculated. Unfortunately, in terms of performance, the private exponent is generally a large number less than the modulus n, and the power-mod function is relatively slow for large n when compared with multiplication.

For a secure 1024-bit modulus n, a typical 1 GHz processor can encrypt data using the RSA algorithm with a secure public exponent of $2^{16}+1$ at a rate of around 125,000 bits per second. Decryption is around 50 times slower at about 2,500 bits per second. This decryption performance may be adequate for non-real time systems, particularly if a public key is used to encrypt a secret symmetric-key and send it to the recipient first. All subsequent information then can be encrypted using the symmetric-key, which improves performance, as symmetric-key algorithms are generally much faster.

In her book, "In Code: A Mathematical Journey", (ISBN 0-7611-2384-9) Sarah Flannery describes what she calls the "Cayley Purser" public key algorithm in Appendix A which requires finding matrices A and C in $GL(2, Z_n)$ that are not multiplicatively commutative, i.e.:

$$AC \neq CA$$

The algorithm then requires generating matrix B using:

$$B=C^{-1}A^{-1}C \qquad (A1)$$

The algorithm further requires generating the matrix G using:

$$G=C^k$$

Where k is a chosen integer greater than 1 or less than −1 so that matrix C cannot be trivially found from matrix G. The C matrix is the private key. {A,B,G,n} form the public key. The matrix rank is assumed to be 2. In the Postscript of Appendix A [see [6.3], pages 290-292], Flannery describes a security flaw in her algorithm because when calculating matrix B above, the matrices to the left and right of matrix A in equation (A1) are relatively inverse to each other, so that any linear multiple of C (modulo n) is also a solution to equation (A1).

In many network applications, client-server models of computer interactions over networks use context-less servers, where the server knows nothing about the client, so all context-specific information is kept on client systems. Cookies are an example of client context information, which are kept on client systems instead of web servers.

The original IP (Internet Protocol) packet transmission protocol is a session-less packet transmission protocol used widely on the Internet. Any concept of communications sessions is kept at a higher level, for example, in applications such as TCP (Transmission Control Protocol). The secure version of IP, called IPSec, is an extremely complex protocol, designed for all applications requiring use of IP. It is therefore used in a session-less manner, i.e., it is not informed when communication sessions begin and end. To minimize the slowness of public key systems, IPSec frequently uses secret (symmetric) key encryption and decryption, where the same key is used to both encrypt and decrypt a message. This in turn requires a secret key exchange, followed by keeping secret keys at both ends of the secure communications path for a period of time that is invisible at the application layer. This secret key persistence is termed a SA (Security Association). SAs are not instantiated at the application level, but must occur and be maintained by IPSec itself, while IPSec is being used in a session-less manner by applications. This makes maintenance of a security state on a multi-client system such as a web server a very complex task, requiring expiring and overlapping SAs, and increased use of processor and memory resources.

To provide context-less servers with public-key encryption, it is desirable not to keep client-specific private symmetric-keys on the server. In this case, the slow decryption rate of public keys can be a problem, even when they are used only to exchange a secret key. Further, the processing requirements for performing simultaneous encryption and decryption should be reduced, allowing for use in low-power applications, such as cell phones, or web-based radio communication systems, such as, blue-tooth and wire-less LAN.

Thus, there is a need for a public key system that can perform both encryption and decryption with relatively fewer calculations, which can result in a higher encryption/decryption throughput, and/or lower power consumption.

DETAILED DESCRIPTION OF THE INVENTION

Figure 1:
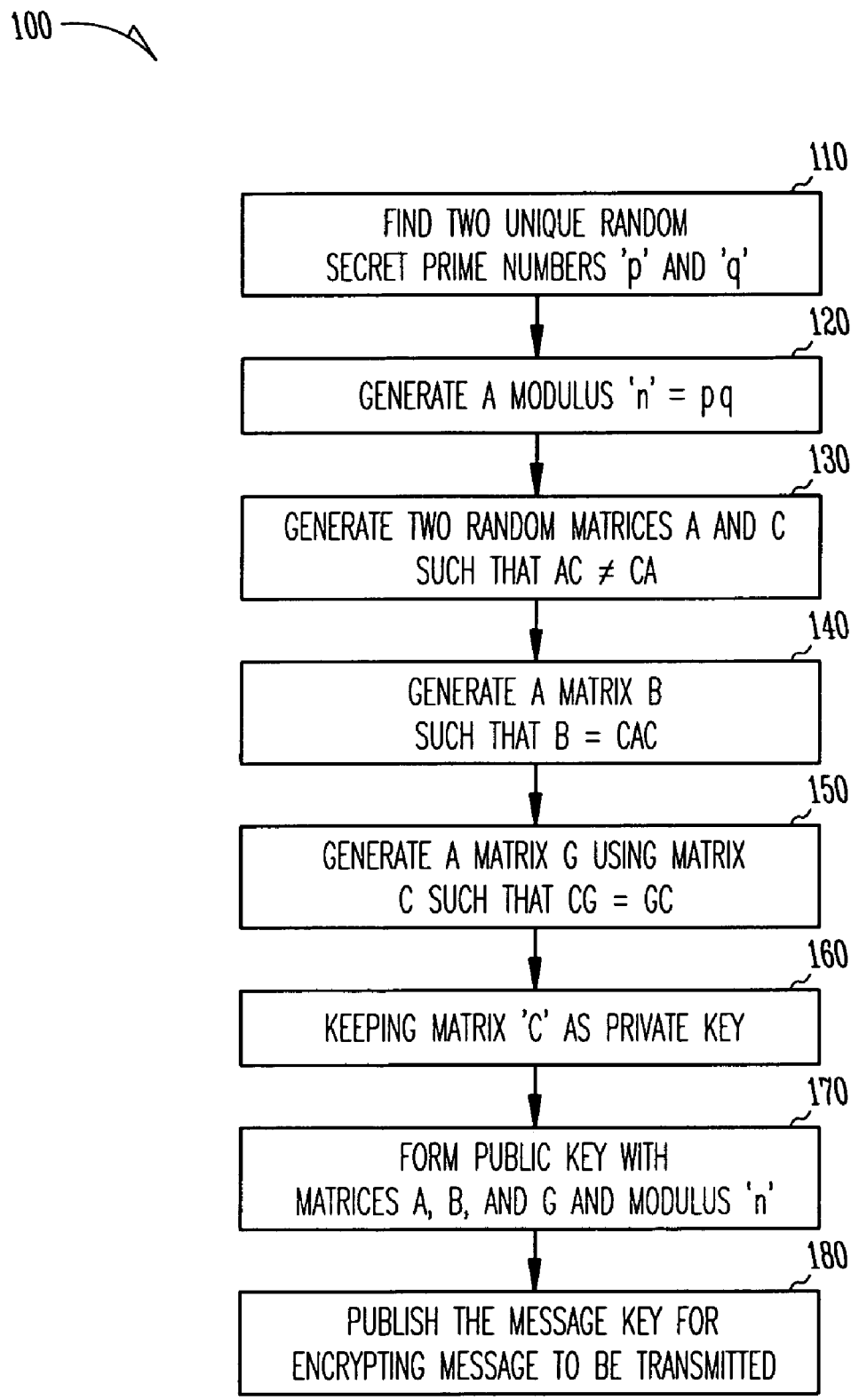
FIG. 1 is a flowchart illustrating one embodiment of generating and publishing a public key for secure data transmission according to the claimed subject matter.

In the following detailed description, reference is made to various specific embodiments in which the invention may be practiced. These embodiments are described with sufficient detail to enable those skilled in the art to practice the invention, and it is to be understood that other embodiments may be employed, and that structural, logical, electrical, and process changes may be made without departing from the teachings of the invention.

In the foregoing description of the preferred embodiments, various features of the invention are grouped together in a single embodiment for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single disclosed embodiment. Thus, the following claims are hereby incorporated into the description of the preferred embodiments, with each claim standing on its own as a separate preferred embodiment of the invention.

Basic Terms and Notations

Lower case characters in the following description represent integers. Upper case characters represent matrices. { } denotes a comma-separated set of values. Square matrices form rings under addition and multiplication because they have the following properties:

$(A+B)+C=A+(B+C)$; associative under addition $A+B=B+A$; commutative under addition $A+0=A$; the 0 matrix (with rank matching $A$) forms the additive identity $A+(-A)=0$; the additive inverse of $A$ is $-A$. They sum to the 0 matrix $A(BC)=(AB)C$; associative property $AI=IA=A$; a (multiplicative) identity matrix $I$ exists which commutes with all $A$ $A(B+C)=AB+AC$; right distributive $(A+B)C=AC+BC$; left distributive Matrices form a group under multiplication when, in addition to the properties of rings above, the following is also true:

$AA^{-1}=A^{-1}A=I$

In other words, for every member of the group A, a unique (multiplicative) inverse matrix exists. Matrices of rank r with integer elements (i.e. elements in Z) are referred to as Mat(r,Z). Matrices with elements in Z, modulo n, are referred to as Mat(r,$Z_n$). Square matrices of rank r with elements in Z modulo n, and for which an inverse matrix exists, are said to belong to the General Linear group GL(r,$Z_n$).

The (multiplicative) inverse $k^-$ of an integer k is calculated, modulo n, (note: the term "reciprocal" is otherwise used when not working in the ring of integers modulo n), such that:

$kk^{-1} \equiv 1 \pmod{n}$

The value $k^{-1}$ is an integer, and it exists and can be found as long as GCD(n,k)=1, where the well-known GCD( ) function finds the Greatest Common Divisor of {n,k}. The inverse of k therefore depends on n, very different from the reciprocal of k. The well-known Extended GCD( ) algorithm is used to actually find multiplicative inverses. If the extended GCD(n,k) returns a value not equal to 1 (an extremely unlikely chance for large n), then the value is a factor of n. The Extended GCD function is also used in matrix inversion, where all elements in the inverse matrix require multiplication by the multiplicative inverse of the determinant of the input matrix, modulo n.

The present invention provides techniques for secure data transmission using a public key system. An embodiment of a method of the present invention is described using FIGS. 1-3. The flowcharts illustrated in FIGS. 1-3 include operations, which are arranged serially in the exemplary embodiment. Many operations in the flowcharts show calculations of results that depend on other previous results. Any re-ordering of these calculations in an embodiment which maintains these dependencies must be viewed as falling under the scope of this invention. However, other embodiments of the invention may execute two or more operations in parallel using multiple processors or a single processor organized as two or more virtual machines or sub-processors. Moreover, still other embodiments may implement the operations as two or more specific interconnected hardware modules with related control and data signals communicated between and through the modules, or as portions of an application-specific integrated circuit. Thus, the exemplary process flow is applicable to software, firmware, and hardware implementations.

FIG. 1 is a flowchart illustrating one example embodiment of a process 100 of generating and publishing a public key for secure data transmission according to the present invention.

The process begins with operation 110 by finding two unique random secret prime numbers p and q. Operation 120 includes generating an integer modulus n using prime numbers p and q. The modulus n is computed according to the equation:

$$n = pq \quad (1)$$

Generally, large prime numbers are chosen for p and q to prevent easy factorization of n to obtain the set of factors {p,q}. Note: if {p,q} are revealed to an attacker, then the roots of integers in $Z_n$ can be found rapidly, and at that point the public key is insecure. In these embodiments, the chosen prime numbers may be discarded after computing modulus n, or they can be kept to speed up message decryption using the well-known Chinese Remainder Algorithm.

All matrices described in the present invention belong to the closed Linear Group of matrices $GL(r,Z_n)$, unless otherwise stated.

Operation 130 includes generating two matrices {A, C} in $GL(r,Z_n)$, such that:

$$AC \neq CA \quad (2)$$

i.e. matrices {A, C} are a pair of matrices that are not multiplicatively commutative modulo n. Note that some randomly chosen pairs of matrices are commutative, but this is statistically very unlikely for large n. For example, a matrix commutes with itself, and therefore with any matrix which is a power of itself. Non-commutative behavior is different than integer multiplication. In the later case, the order of multiplication makes no difference to the product obtained. Wherein r is the rank of matrices and $Z_n$ denotes elements in integer modulo n.

To ensure that matrices {A, C} are both in $GL(r,Z_n)$, both matrix determinants should be tested for relative primeness to n (determined using a GCD algorithm). Note that 0 is divisible by n, so GCD(0,n)=n and therefore 0 is not relatively prime to n. The chance of finding either i) commutative behavior or ii) common prime factors with n are extremely low for a large n, so checking for these properties may be omitted. However, applying the checks allow algorithm implementations to be reliably tested for a small n. Smaller rank matrices are preferable (particularly r=2) because encryption and decryption is faster. Higher rank matrices can be used (i.e., r>2), but they result in more computation, larger minimum message sizes, and generally no significant improvement in security because, as is seen later, the best way of breaking this type of encryption is to factorize n.

Operation 140 includes generating a matrix B in the group using the equation:

$$B = CAC \quad (3)$$

Wherein {A, C} are matrices found in operation 130.

Operation 150 includes generating a matrix G that is multiplicatively commutative to C, modulo n, i.e. CG=GC. One embodiment of doing this uses the fact that powers of a matrix commute, so that:

$$G = C^k \quad (4)$$

where k is an integer. To be provably secure, k must be even, and preferably small (e.g., k=2) for faster key generation. If r=2, then k cannot be an odd number that is small or guessable. In all cases, k cannot belong to the set {−1, 0, 1}.

In another embodiment, G is generated using a linear combination of powers of C up to r−1 using:

$$G = \sum_{i=0}^{r-1} u_i C^i \quad (5)$$

where each of the r values of $u_i$ are randomly generated values in $Z_n$, and preferably with at least one $U_i \neq 0$ for i>0 so that G does not commute with A. From (5), the number of combinations of $u_i$ values gives the number of possible G matrices from a given C as $n^r$. Generating truly random values in the inclusive range 0 to n−1 is possible (at a fairly slow rate) on a computer, but hardware based random number generators can give much better number generating rates. As random number generation is also needed for message encryption, this may be a good alternative method. The generation of random numbers can be a significant overhead for short messages, so hardware based random number generators may be used to economically generate random sets of values of u and v in equations (5) or sets of v in equation (6).

Operations 160 and 170 include keeping matrix C as the private key, and forming {A,B,G,n,r} as the public key, respectively. In a standardized algorithm, a known value of r (e.g., r=2) may be assumed, so r may not need to be in the public key. Operation 180 includes publishing the formed public key {A,B,G,n,r} for encrypting messages to be transmitted.

Figure 2:
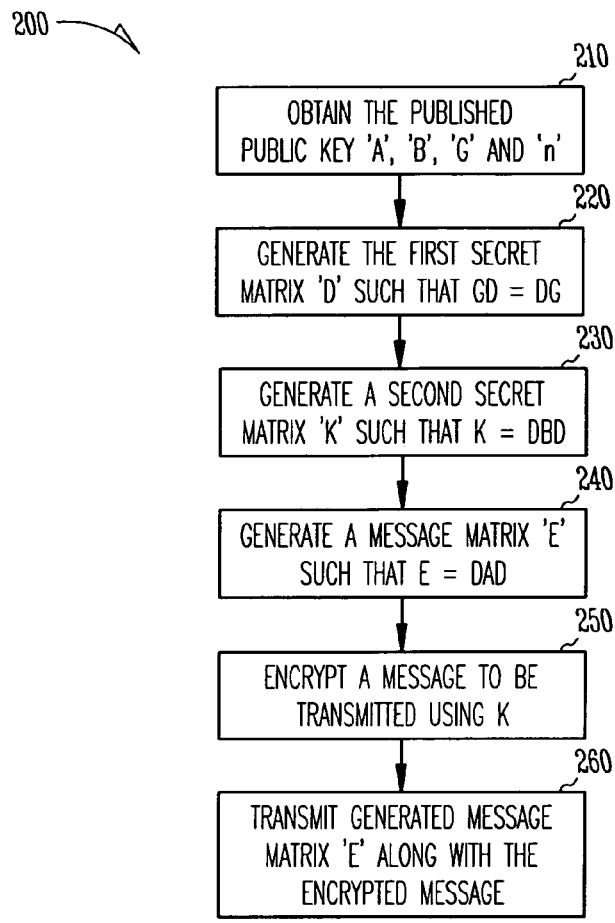
FIG. 2 is a flowchart illustrating one embodiment of encrypting data to be transmitted using the published public key shown in FIG. 1 according to the claimed subject matter.

FIG. 2 is a flowchart illustrating one embodiment of a process 200 of encrypting data to be transmitted using the published public key shown in FIG. 1 according to the present invention.

The process begins with operation 210 by obtaining the published key A, B, G, and n, and matrix rank r for encrypting a message to be transmitted. Operation 220 includes generating a first random secret matrix D that is commutative with the obtained matrix G. In some embodiments, the first random secret matrix D is generated using the equation:

$$D = \sum_{i=0}^{r-1} v_i G^i \quad (6)$$

where $G^0=I$, the identity matrix with the same rank as G, and $v_i$ form a set of r secret and independently random integers modulo n, and at least one $v_i \neq 0$ for i>0 so that D does not commute with A.

Operation 230 includes generating a second secret key matrix K using the generated matrices B and D (later we shall see that K is able to be found easily by the receiver, but not by an eavesdropper). The second secret key matrix is computed according to the equation:

$$K=DBD \qquad (7)$$

Operation 240 includes generating a message matrix E using the received public key matrix A, and the generated matrix D. The message matrix E is generated according to the equation:

$$E=DAD \qquad (8)$$

Operation 250 includes encrypting a message to be transmitted by applying all or part of K from (7) as an encryption key in a symmetric-key encryption system. A symmetric-key encryption algorithm uses the same key to encrypt and decrypt a message, so if the message recipient can re-obtain K, then decryption is also possible. Examples of symmetric key ciphers include DES (Data Encryption Standard), IDEA (International Data Encryption Algorithm), FEAL (Fast Data Encipherment Algorithm), RC5, etc.

In one embodiment, a symmetric-key encryption algorithm includes partitioning and packaging an obtained message into a sequence of unencrypted matrices $U_i$. Then each of the unencrypted matrices are encrypted to form a series of corresponding encrypted matrices such that $U_i'=KU_iK$.

Operation 260 includes transmitting the generated message matrix E along with the encrypted message. The one or more encrypted matrices must be transmitted in a known index order.

Figure 3:
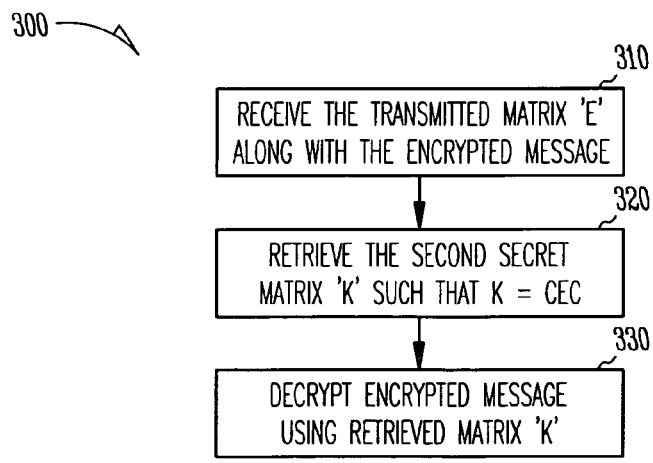
FIG. 3 is a flowchart illustrating one embodiment of decrypting the transmitted encrypted data shown in FIG. 2 according to the claimed subject matter.

FIG. 3 is a flowchart illustrating one embodiment of a process 300 of decrypting the transmitted encrypted message shown in FIG. 2 according to the present invention.

The process begins with operation 310 by receiving the transmitted message matrix E along with the encrypted message. In some embodiments, operation 310 includes receiving the sequence of encrypted matrices $U_i'$ obtained by using the symmetric-key encryption algorithm.

Operation 320 includes retrieving the second secret matrix K using the received message matrix E and the kept private key matrix C. The second secret matrix K is calculated according to the equation:

$$K=CEC \qquad (9)$$

Operation 330 includes decrypting the received encrypted message using the retrieved second secret matrix K. In some embodiments, the received encrypted message is decrypted by applying all or part of K from (9) as a decryption key in a symmetric-key encryption system. Symmetric-key encryption uses the same key to encrypt and decrypt a message, so if the message recipient can re-obtain K, then decryption is also possible. In some embodiments, the received encrypted message is decrypted by obtaining a matrix Q that is the multiplicative inverse of the retrieved second secret matrix K using $Q=K^{-1}$. Obtained matrix Q is then used to decrypt each of the obtained encrypted matrices $U_i'$ to retrieve the corresponding decrypted matrices $U_i$ by using $Q U_i'Q$. Decrypted matrices $U_i$ are then unpacked and concatenated to obtain the transmitted message.

Proof that K can be Found by the Receiver

By using (8) to eliminate E in (9), we get:

$$K=CDADC \qquad (10)$$

From (4) or (5), C and G are multiplicatively commutative, and from (6), G commutes with D. Therefore C commutes with D, so that (10) can be rewritten as:

$$K=DCACD \qquad (11)$$

From (3), we replace CAC with B to obtain:

$$K=DBD \qquad (12)$$

which agrees with (7), proving that (9) correctly obtains K at the receiver.

Proof of Security of the Public Key

The reason the modulus n is a product of two unknown primes is because it can be made extremely difficult to find its prime factors for a sufficiently large n, because it is well known that finding factors of n is equivalent to finding roots modulo n. From (4), C may be found from G if k is known or small. Therefore, the method cannot use a prime number for n, as n is then its own prime factorization. The method could use values of n with more than two prime factors, but for a given size of n, such values are easier to factorize. Larger values of n require more accurate and slower computations. Therefore, for a given computational effort, the best security is obtained when two large random primes are used, with roughly comparable sizes. This type of modulus n is also the approach used in the RSA public key modulus, and some other public key methods such as Rabin's scheme. As will be seen later, the proof of security of the new public key algorithm also relies on the computational difficulty of finding square roots modulo n.

The Cayley Hamilton Theorem

Let A be an r×r matrix in Mat(r,Z), and p(x) be its characteristic polynomial. Then the Cayley Hamilton theorem states that p(A)=0. The characteristic polynomial in x of a matrix A is given by:

$$p(x)=\text{Determinant}(A-xI) \qquad (14)$$

where I is the identity matrix with the same rank as A (i.e., $I=A^0$).

Finding the Smallest Sets of Mutually Commutative Matrices

If $a_{ij}$ represents the elements of a matrix A at row i, column j, then for a rank r=2 matrix, the characteristic polynomial p(x) is:

$$\text{Determinant}\begin{bmatrix} a_{00}-x & a_{01} \\ a_{10} & a_{11}-x \end{bmatrix} = (a_{00}-x)(a_{11}-x)-a_{01}a_{10} \qquad (15)$$

Collecting terms in x on the right, we obtain the characteristic polynomial as:

$$p(x)=x^2-x(a_{00}+a_{11})+(a_{00}a_{11}-a_{01}a_{10}) \qquad (16)$$

Substituting A for x (according to the Cayley-Hamilton theorem) and setting the result equal to 0 gives:

$$p(A)=A^2-A(a_{00}+a_{11})+(a_{00}a_{11}-a_{01}a_{10})I=0 \qquad (17)$$

This result implies that $A^2$ can be expressed in the form:

$$A^2=k_1A+k_2I \qquad (18)$$

i.e. the square of matrix A can be expressed as a linear sum of A and the identity matrix. This also implies that:

$$A^3=AA^2=A(k_1A+k_2I)=k_1A^2+k_2A \qquad (19)$$

The $A^2$ term in the right expression can be eliminated using (18) to give:

$$A^3 = k_1(k_1A + k_2I) + k_2A = (k_1+k_2)A + k_1k_2I \quad (20)$$

Continuing this procedure, it can be seen that any power of A can be decomposed into a linear sum of A and I. Similar results can be obtained for higher rank matrices, where a matrix A of rank r has a characteristic polynomial up to degree $x^r$ which can be decomposed into a linear sum of all powers of A from 0 to r−1, e.g., a rank 5 matrix of any power can be decomposed into a linear sum of its powers from 0 (the identity matrix) to 4. Therefore, for any A of rank r, and integer power m:

$$A^m = \sum_{i=0}^{r-1} u_i A^i \quad (21)$$

for some set of r values of $u_i$. This result shows the equivalence between (4) and (5). Any equality in Mat(r, Z) is also true in $GL(r, Z_n)$, so if B is a matrix in $GL(r, Z_n)$, then the following must be true:

$$B^m = \sum_{i=0}^{r-1} u_i B^i \quad (22)$$

This result also shows that any polynomial in B can be decomposed into this form of sum. All combinations of r values of $u_i$ modulo n will then generate all the members of the commutative set. The number of set members is given by:

$$\text{members}(n,r) = n^r \quad (23)$$

members of the commutative set (but not all members of the commutative set in some cases, as discussed later). This result agrees with the number of matrices G that can be generated from all possible combinations of $u_i$ and a given C in (5). This result is the minimum commutative set size, and it is the guaranteed minimum number of matrices to search for secret matrix C (knowing G—another member of the same commutative set) by brute force, should this approach be taken to break the public key. This is actually a far greater search space than a brute force search for prime factors of n, and is not a feasible approach to breaking the public key.

Each set contains all possible multiples of the identity matrix, modulo n, so the number of matrices that do not commute with any others outside of the set is:

$$\text{ExclusiveMembers}(n,r) = n^r - n \quad (24)$$

For an r×r matrix with elements modulo n, the total number of possible matrices is:

$$\text{matrices}(n,r) = n^{r \times r} \quad (25)$$

If the characteristic polynomical of the matrix A is factorizable, then it can be expressed as a product of a set of lower order polynomials in x. If some product of a subset of these polynomials is zero, then we have a reduced degree polynomial in A (compared with (21)) that is equal to zero, and the reduced polynomial is no longer uniquely characterized by the matrix A.

For example, a rank r=3 matrix A will have a cubic characteristic polynomial with polynomial terms in x. If that polynomial is factorizable, then it is possible for two of these roots to multiply to zero in the group when A is substituted for x. The existence of reduced degree polynomials is only possible because of modulus n when working in $GL(r, Z_n)$. This matrix A then has a reduced degree polynomial factor.

It is therefore possible for other matrices to have a factorizable characteristic polynomial that shares this same reduced degree polynomial, so the members of these sets will also commute with the set associated with matrix A. This proves the existence of larger commutative sets than defined in (23) when r>2. However, it is easy to show that upper triangular or lower triangular matrices do not commute for any $GL(r, Z_n)$, so we know that we cannot chose a group where all matrices commute. In fact, it can be shown that a minimum bound on the number of non-commutative sets is:

$$n^{2(r-1)} \quad (26)$$

For proof of security of the public key, it is sufficient to show that there is a minimum number of members in each commutative set (making searches based on a known member of the set impossibly difficult), and that more than one set exists, allowing large combinations of pairs of non-commutative matrices A and C exist in (2).

Given the large number of non-commutative sets, it is also very easy to randomly generate suitable pairs of matrices {A,C} in $GL(r,Z_n)$ needed in (2)—in fact, the chance that A and C belong to the same commutative set is, from (26), 1 in $n^{2(r-1)}$ or less, although this is only relevant when considering the speed of generating public keys, and is not relevant to public key security.

It is well known that finding the kth roots of G modulo n from (4) alone is equivalent to factorizing n, which is assumed to be impossibly difficult for large enough n, even in the simplest non-trivial case when k=2.

A more effective approach to breaking a key attempts to utilize all known information about the public key, although in the process of using this information, it is then shown that within certain constraints, the key can be proven to be secure. The following equations apply to any k in (4) with rank r=2 matrices, and we later see that use of either small odd k or known odd k is insecure. First we define a known M from the known matrices B and G in the public key:

$$M = BGB^{-1} \quad (27)$$

From (3), B contains matrix A as a factor, and from (4), G commutes with C, so from (2) BG≠GB and therefore M≠G. Next we eliminate B from (27) using (3) to get:

$$M = (CAC)G(CAC)^{-1} \quad (28)$$

From (4), C and G must commute, so we swap the G with a neighboring C, and expand out the inverse matrices to get:

$$M = CAGCC^{-1}A^{-1}C^{-1} = CAGA^{-1}C^{-1} \quad (29)$$

As C commutes with G and not matrix A, then G does not commute with matrix A. The known matrix N is defined from known public key matrices {A, G} as:

$$N = AGA^{-1} \quad (30)$$

As GA≠AG then N≠G. From (29) and (30), we get:

$$M = CNC^{-1} \quad (31)$$

N contains matrix A as a factor, so CN≠NC and therefore M≠N. The form of (31) is similar to the CP algorithm public key with the security flaw. The following attack on the new algorithm is based on this transformation, but unlike the CP algorithm, we later find that the attack applies only for odd, guessable values of k.

The form of (31) allows us to find a linear multiple of C, i.e. uC, but neither of {u, C} are known. However, unlike the CP algorithm, only when $u^2 \equiv 1 \mod n$ will the congruence (3) be satisfied, as the values of u do not cancel. This is the principal reason for the security of the new algorithm for rank r=2 matrices.

From (4), G is a power of C, so the result (22) obtained from the Cayley-Hamilton theorem allows the definition of G for matrices with rank r=2 to be expressed as a linear combination of the identity matrix (with matching rank r=2) and C as:

$$G = u_0 I + u_1 C \quad (32)$$

This relationship is implicit using (4) or explicit using (5) in the public key generating algorithm, but method (5) generates the equivalent of raising C to a large, unknown power, k, so it is secure. However, it requires generating truly random numbers, so it is worth proving the security of (4). We now see how it may be possible to find C for rank r=2 matrices under certain circumstances. Note that from (5), higher rank matrices have too many unknowns in $u_i$, so they are not vulnerable to this attack. However, higher rank matrices are computationally more expensive, so the r=2 case is the most useful to characterize. From (32), a linear multiple of C can be obtained in terms of unknown $v_i$ values as:

$$v_1 C = G + v_0 I \quad (33)$$

From (31), multiply both sides by C on the right:

$$MC = CN \quad (34)$$

Scaling both sides by $v_1$:

$$M v_1 C = v_1 CN \quad (35)$$

and substituting for $v_1 C$ from (33), we get:

$$M(G + v_0 I) = (G + v_0 I) N \quad (36)$$

Collecting terms with $v_0 I$ on the left, and others on the right ({$v_0$, I} both commute with everything), we get:

$$v_0 I (M - N) = GN - MG \quad (37)$$

so that $$v_0 I = (GN - MG)(M - N)^{-1} \quad (38)$$

We know that $M \neq N$ from (31), so either matrix inversion is possible, or else n is factorized. From (33), and using (38) to eliminate $v_0 I$, we get:

$$v_1 C = G + (GN - MG)(M - N)^{-1} \quad (39)$$

The right side of (39) consists entirely of known matrices, and therefore the product $v_1 C$ can be found. Multiplying with $v_1$ is commutative, so the identity $$v_1^2 CACB^{-1} = (v_1 C) A (v_1 C) B^{-1} \quad (40)$$

is true, which simplifies on the left using (3), so we can find $v_1^2$ as:

$$v_1^2 I = (v_1 C) A (v_1 C) B^{-1} \quad (41)$$

From (39), we know $v_1 C$, and we know {A,B} from the public key, so the factor $v_1^2$ can be found. To break the key using (41), a square-root of $v_1^2$ modulo n has to be found in order to find $v_1$, and then find C from the known $v_1 C$. Obtaining such a square root is known to be equivalent to factorizing n. Therefore, results (39) and (41) cannot be used as a basis for an attack on their own.

Now we make use of the relationship between C and G in (4):

$$(v_1 C)^k = v_1^k C^k = v_1^k G \quad (42)$$

so we can find:

$$v_1^k = (v_1 C)^k G^{-1} \quad (43)$$

as $v_1 C$ is known from (39), and G is known from the public key.

From (41), we know $v_1^2$, so if k is a finite unknown odd integer, then a search by repeated division of $v_1^2$ into $v_1^k$ from (43) will eventually yield a remaining factor $v_1$. The value can be rapidly verified as correct for each search step by squaring the obtained value and comparing with $v_1^2$ in (41). If k is a known odd integer, then the number of times $v_1^2$ divided into $v_1^{k-1}$ can be immediately found as (k−1)/2. Then $v_1^{k-1}$ can be found easily using a power-mod function based on successive squarings of $v_1$. The multiplicative inverse of $v_1^{k-1}$ is then obtained (modulo n) and multiplied by $v_1^k$ from (43) to obtain $v_1$. Once $v_1$ is found, then C can be found from (39), and the public key is broken. If k is a large, unknown odd integer modulo n, then the key is secure against this particular attack, but its security has not been proved.

In the Cayley-Purser public key algorithm, generating the public key by calculating C to the power k modulo n in (4) is a relatively slow operation, particularly compared to multiplication for large k, so for efficient implementations with rank 2 matrices, k should be relatively small. For the public key to be secure in this case, k must be an even, non-zero integer. k=2 is the fastest value for calculating (4) that is also secure from this attack. For higher rank matrices, the attack does not apply, but the same value of k=2 also works well.

Having proven that G can be generated using the CP public key algorithm, it has been shown that the code is not secure for rank 2 matrices and for odd k that is known or guessable. We now prove the public key is secure for known even k. We do this by creating a public key according to (1) . . . (3), and by generating a second public key derived from the first one. We then show that finding C for both keys is equivalent to finding the $\sqrt{d}$ modulo n for a chosen d. In the derived public key, we assume the existence of a new secret matrix C' that is related to C by:

$$C' = \sqrt{d} C \quad (44)$$

and that both C' and $\sqrt{d}$ are unknown. Also, {A,n} are shared between the C and the derived C' public keys. Substituting C' for C in (3), we get B' of the derived key as:

$$B' = C'AC' \quad (45)$$

and eliminating C' using (44), and collecting $\sqrt{d}$ terms, we get:

$$B' = dCAC = dB \quad (46)$$

Note that B' is calculated from {B,d,n}, and not from $\sqrt{d}$ or C', which are unknown when the key is generated.

By also substituting C' for C in (4), and using the fact that k is even so k/2 is an integer, we get:

$$G' = (C'^2)^{k/2} \quad (47)$$

Then we eliminate C' using (44) to obtain:

$$G' = (dC^2)^{k/2} \quad (48)$$

By regrouping powers:

$$G' = d^{k/2} C^k = d^{k/2} G \quad (49)$$

Note that G' is calculated from {G,k,d,n} only (and not from $\sqrt{d}$ and C' which are unknown).

The following steps now complete the proof:

Step (a): A first public key is generated according to (1) . . . (4), and with a large composite n whose factors are unknown, so the public key {A,B,G,n} and the exponent k and private key matrix C are all known.

Step (b): A second public key (related to the public key generated at Step (a)) is generated. First, a value d is chosen for which the value of $\sqrt{d}$ is unknown modulo n. The new public key consists of {A,B',G',n} where B' is calculated from B using (46), and G' is calculated from G using (49) and the known k. The values {A,n} are the same as in the key generated in Step (a). Note that neither the matrix C' nor $\sqrt{d}$ are used in generating either public key.

Step (c): The matrix C' is "found" from all available information—{A,B,B',C,G,G',d,k,n} using a hypothetical polynomial-time algorithm. Note: if C' cannot be found from these, then it certainly cannot be found from the derived public key {A,B',G',n}, which is a subset of the above set.

Step (d): The value of $\sqrt{d}$ can now be found from (44) using C generated in Step (a), and C' found in Step (c) using:

$$\sqrt{d}I = C'C^{-1} \quad (50)$$

Step (e): The value of $\sqrt{d}$ was not involved in generating B' or G', so finding $\sqrt{d}$ modulo n by finding C' is equivalent to finding $\sqrt{d}$ modulo n for a chosen d. If C' can be found in polynomial time, then this is computationally equivalent to factorization in polynomial time, which is assumed to be impossible. Therefore, as all other steps are simple to perform, it is not possible to find C' in Step (c) in polynomial time, and no hypothetical algorithm for rapidly breaking the public key exists.

QED

If the new public key could be broken, and factorization of n could be achieved from Step (c), then the technique could be used to break RSA public keys, and Rabin's public key scheme, amongst others.

A Visual Analogy to Obtaining K at the Sender and Receiver

Figure 4:
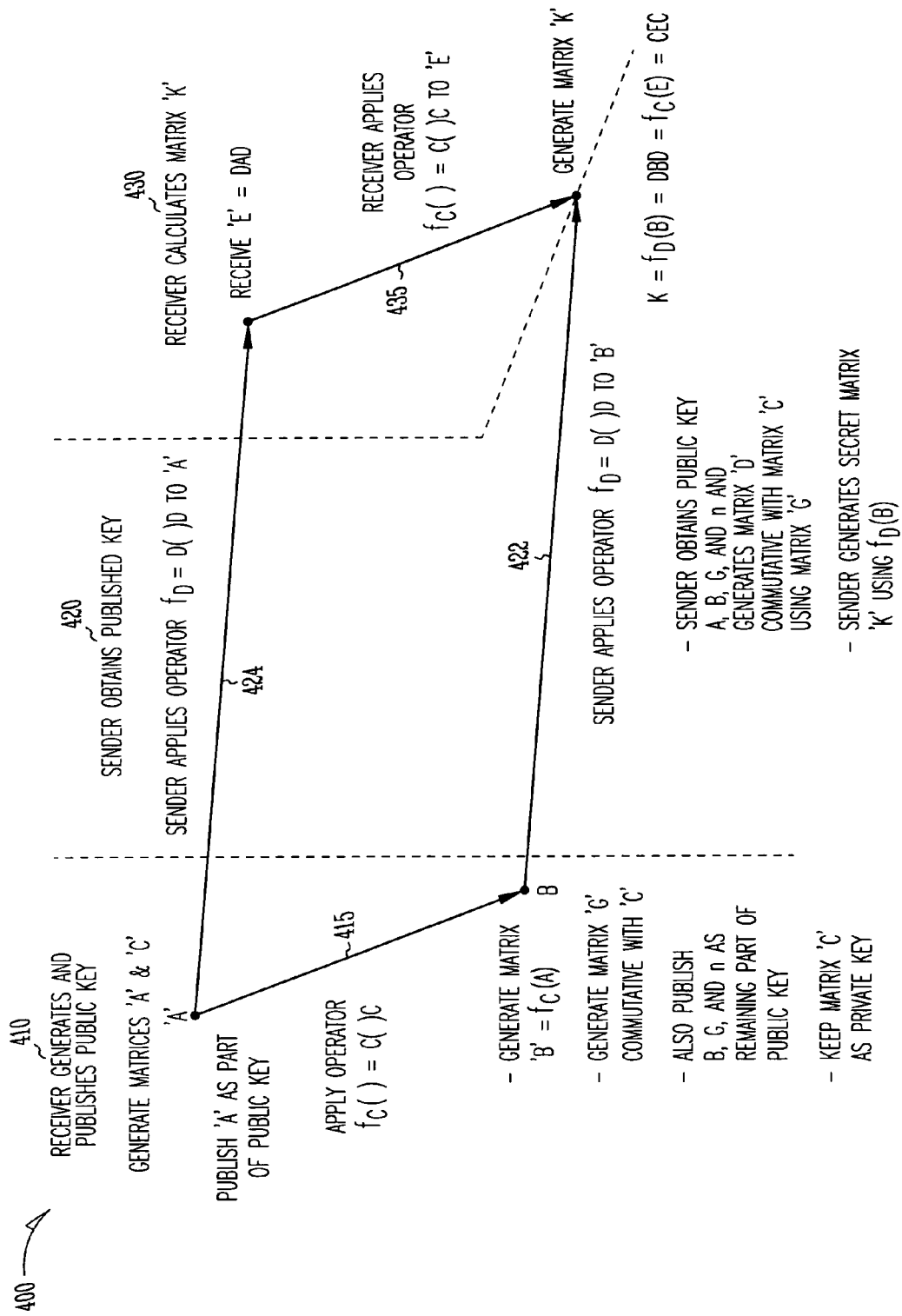
FIG. 4 is an illustration including a vector diagram of one embodiment of an exchange of secret matrix K between a sender and a receiver according to the claimed subject matter.

FIG. 4 is a vector diagram 400 that illustrates an analogy of how secret matrix K is exchanged between a sender and a receiver according to the claimed subject matter. This diagram shows how, starting from the top-left at matrix A, both the sender and receiver can arrive at the same matrix K on the bottom right, by following two different paths around a parallelogram. The lengths and directions of each side of the parallelogram represent operators applied to one matrix to obtain another.

FIG. 4 shows the C( )C operator as two vectors representing the shorter sides 415 and 435 of the parallelogram, and the D( )D operator as two vectors representing the longer sides 422 and 424. The important thing to notice is that the vectors on opposite sides of the parallelogram are the same direction and length, although their depicted directions and lengths are for illustrative purposes only. In actuality, the operators are multiplicative rather than additive, so FIG. 4 represents a kind of 'log' of the operators, allowing vector length addition to be used. Also, the present invention uses matrices in the group GL(r, $Z_n$), which cannot actually be rendered onto a two-dimensional surface.

FIG. 4 illustrates a far left portion 410, a middle portion 420, and a far right portion 430. The far left portion 410 of the vector diagram 400 illustrates using a vector 415 to represent operator C( )C as a function applied to A to obtain B=C(A)C as in (3). The length and direction of the vector represents the scaling affect of the C( )C operator, and is uniquely determined by secret matrix C.

The middle portion 420 of the vector diagram 400 assumes the sender has obtained the published public key transmitted by the receiver, and is using it to generate a first random secret matrix D that is commutative with the kept matrix C and generated matrix G. The sender does not know the direction of the operator vector C( )C, but does know the two points in the parallelogram at {A,B} from the published public key. The message sender can then apply the D( )D operator to the matrices {A,B} to obtain E=D(A)D from (8), and K=D(B)D from (7), represented by scaling and rotating vectors 422 and 424 in FIG. 4. Note that the sender obtains K by traversing first the C( )C path from the top left at matrix A to B, and then the D( )D path from B to K. The sender then encrypts messages to be transmitted using the generated second secret matrix K and transmits the encrypted messages along with the message matrix E.

The far right portion 430 of the vector diagram 400 illustrates the receiver receiving the transmitted encrypted messages along with the message matrix E from the sender. Vector diagram 400 further illustrates using a vector 435 how, from the sender in the middle portion 420, the receiver obtains the message matrix E via the D( )D path across the top of the parallelogram, from the starting point at matrix A. As the receiver is also the public key generator, the C matrix is known. The C( )C operator can then be applied to the E matrix to obtain the final path down to K. The Receiver's route to K from A is therefore via the D( )D to E, and then the C( )C operator. This route around the parallelogram is different from the route that the sender took from A to K described earlier. This is equivalent to saying that the C( )C and D( )D operators commute with each other—in other words, they can be applied in either order from A to K. Also note that the receiver manages to obtain K without knowing D, and similarly, the sender gets from A to K without knowing C.

Figure 5:
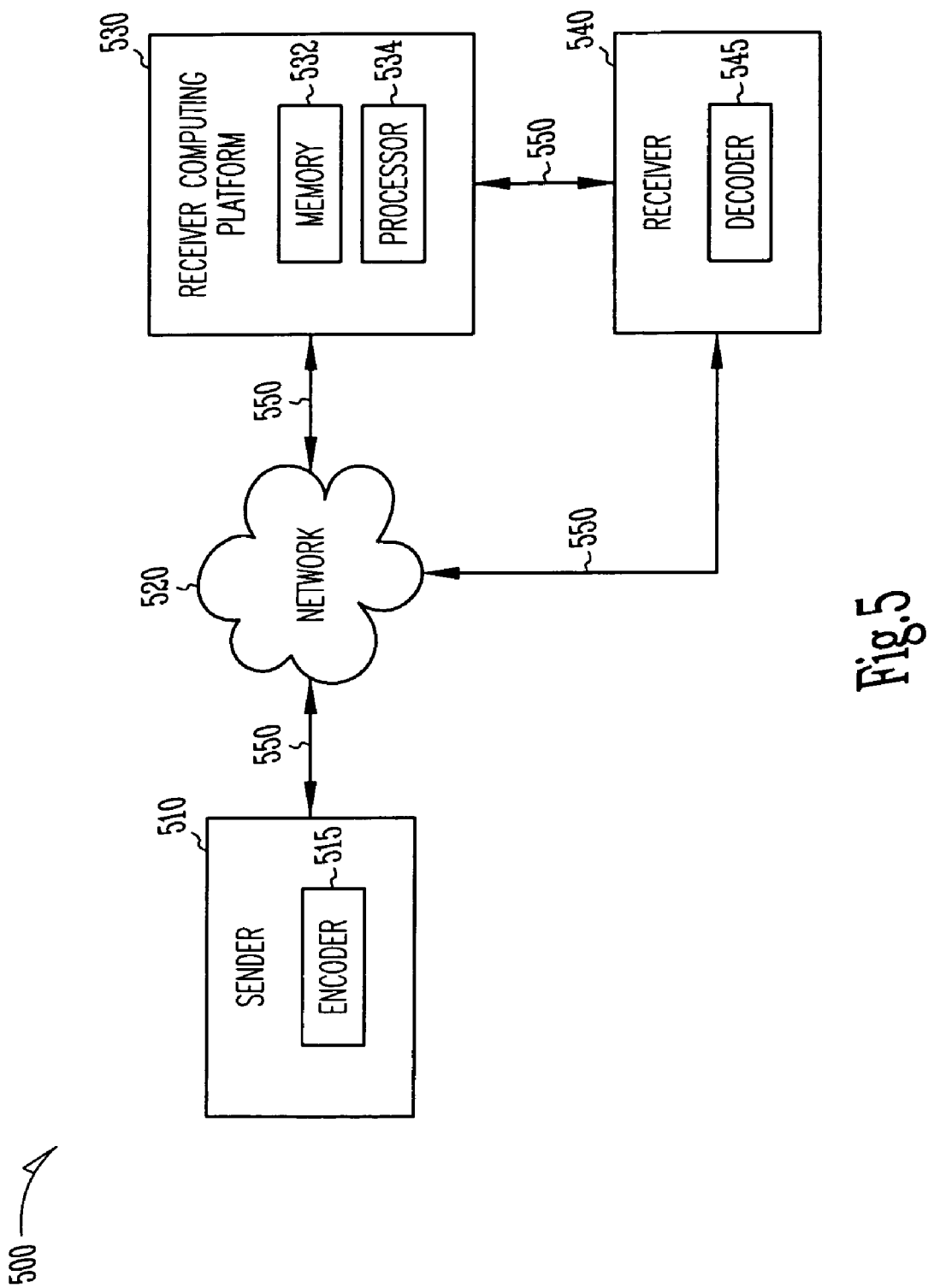
FIG. 5 is a schematic diagram illustrating an example embodiment of a secure data transmission system according to the claimed subject matter.

FIG. 5 illustrates one embodiment of a system 500 used for secure data transmission according to the present invention. FIG. 5 includes an example of a system 500 having a sender 510 coupled to a network 520. In addition, FIG. 5 includes a receiver computing platform 530 coupled to network 520. Further, FIG. 5 includes a receiver 540 coupled to both network 520 and receiver computing platform 530. In some embodiments, sender 510, receiver computing platform 530, and receiver 540 are coupled to network 520 through a transmission medium 550. Sender 510 includes an encoder 515. Receiver computing platform 530 includes memory 532 and a processor 534. Receiver 540 includes a decoder 545. Transmission media 550 may include, for example, fiber optic cable, category 5 (CAT-5) networking cabling, or wireless media such as wireless local area network (LAN).

In operation, processor 534 generates two matrices A and C of rank r and with each element in the integers modulo n such that AC does not equal CA. In these embodiments, modulo n is obtained as a product of two unique randomly chosen secret prime number p and q. Also, in these embodiments, r is the rank of the matrices A and C. Processor 534 then generates matrix B by using the generated matrices A and C such that B=CAC. Process 534 further generates matrix G such that the generated matrix G is in the same multiplicatively commutative subgroups as matrix C. Processor 534 then publishes the generated matrices A, B, G, and modulo n and matrix rank r as the public key and retains the generated matrix C as the private key. The generation of matrices A, B, C, G, and modulo n and matrix rank r are explained in more detail with reference to FIG. 1. In some embodiments, memory 534 stores the generated public and private keys.

Encoder 515 desiring to transmit a secure message obtains the published pubic key including matrices A, B, G, and modulo n and matrix rank r through the network 550 to encrypt the message to be transmitted. Encoder 515 then generates a first random secret matrix D that is multiplicatively commutative with the obtained matrix G. Encoder 515 then generates a second secret matrix K using the generated matrices B and D. Encoder 515 then obtains a message to be transmitted securely and encrypts the obtained message using a symmetric-key algorithm by using the generated secret matrix K as the key. Encoder 515 then transmits the generated message matrix E along with the encrypted message. The generation of first and second secret matrices D and K are explained in more detail with reference to FIG. 2.

Decoder 545 desiring to receive the encrypted message receives the transmitted message matrix E and the encrypted message through the network 550. Decoder 545 then retrieves the second secret matrix K using the received message matrix E and the privately kept matrix C. Decoder 545 then decrypts the received encrypted message using the retrieved second secret matrix K with a symmetric-key decryption algorithm, to obtain the transmitted message. The process of using symmetric-key encryption and decryption to encrypt and decrypt messages, respectively, is explained in more detail with reference to FIGS. 2 and 3.

Figure 6:
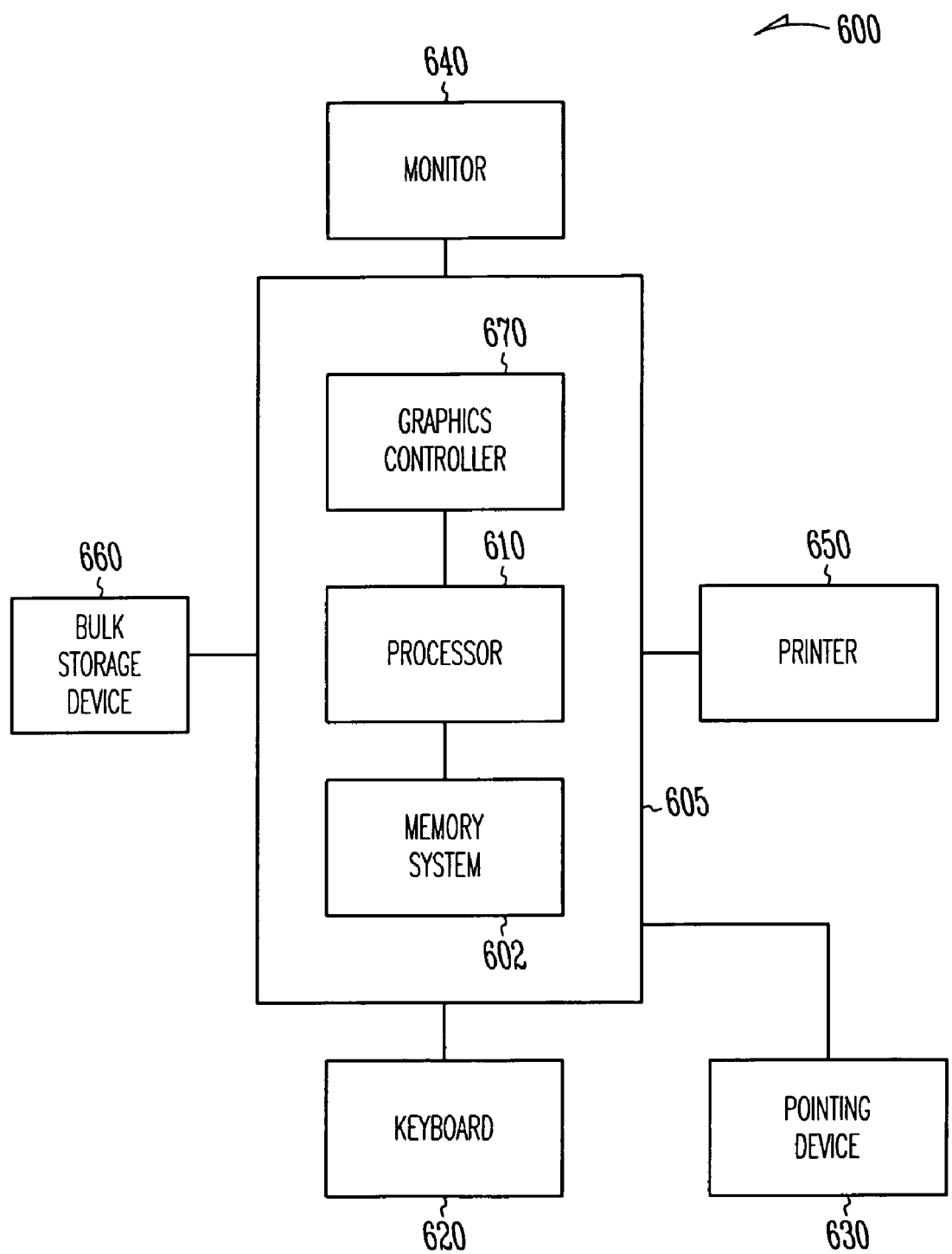
FIG. 6 is a block diagram of an exemplary computer system implementing embodiments of the present invention, such as those shown in FIGS. 1-5.

FIG. 6 is a block diagram of a system according to one embodiment of the present invention. Computer system 600 contains a processor 610 and a memory system 602 housed in a computer unit 605. Computer system 600 is but one example of an electronic system containing another electronic system, e.g., memory system 602, as a subcomponent. The user interface components include a keyboard 620, a pointing device 630, a monitor 640, a printer 650, and a bulk storage device 660. It will be appreciated that other components are often associated with computer system 600 such as modems, device driver cards, additional storage devices, etc. It will further be appreciated that processor 610 and memory system 602 of computer system 600 can be incorporated on a single integrated circuit. Such single-package processing units reduce the communication time between the processor and the memory circuit. Any of these components of the system may contain a memory device that stores instructions that can be executed by a processor to perform the secure data transmission of the present invention.

The above description illustrates preferred embodiments, which achieve the features and advantages of the present invention. It is not intended that the present invention be limited to the illustrated embodiments. Modifications and substitutions to specific process conditions and structures can be made without departing from the spirit and scope of the present invention. Accordingly, the invention is not to be considered as being limited by the foregoing description and drawings, but is only limited by the scope of the appended claims.

What is claimed is:

1. A method, comprising:
   obtaining a message;
   retrieving a published public key including matrices A, B, G, and n and matrix rank r for encrypting the message, wherein matrix B is generated by using generated matrices A and C such that B≡CAC;
   generating a first random secret matrix D that is multiplicatively commutative with the matrix G;
   generating a second secret matrix K such that K=DBD;
   generating a message matrix E such that E=DAD;
   encrypting the message to provide an encrypted message using a symmetric-key algorithm by using the second secret matrix K as a key; and
   transmitting the encrypted message and the message matrix E.

2. The method of claim 1, wherein the encrypted message and the message matrix E are sent together to at least one recipient.

3. The method of claim 1, wherein encrypting the message using a symmetric-key algorithm further comprises:
   partitioning and packing the message into a sequence of unencrypted matrices $U_i$; and
   encrypting each of the unencrypted matrices to form a sequence of corresponding encrypted matrices such that $U_i'=KU_iK$.

4. The method of claim 1, wherein generating the first random secret matrix D that is multiplicatively commutative with the matrix G, comprises:
   generating the first random secret matrix D using the equation:

$$D = \sum_{i=0}^{r-1} v_i G^i$$

wherein $G^0=I$, the identity matrix having a rank equal to a rank of the matrix G, and $v_i$ form a set of r secret and an independently random integers modulo n, and at least one $v_i \neq 0$ for i>0 so that D does not commute with A.

5. A computer-readable medium having computer-executable instructions, the computer-executable instructions comprising:
   obtaining a message to be sent securely;
   retrieving, from a data store, the published public key, the published public key including matrices A, B, G, and n for encrypting a message to be transmitted, wherein each of the retrieved matrices have a predetermined matrix rank of r, wherein matrix B is generated by using generated matrices A and C such that B≡CAC;
   generating a first random secret matrix D that is multiplicatively commutative with the retrieved matrix G;
   generating a second secret matrix K such that K=DBD;
   generating a message matrix E such that E=DAD;
   encrypting the message using a symmetric-key algorithm by using the generated second secret matrix K as the key; and
   transmitting the generated message matrix E along with the encrypted message.

6. The computer-readable medium of claim 5, wherein encrypting the message using a symmetric-key algorithm further comprises:
   partitioning and packing the message into a sequence of unencrypted matrices $U_i$; and
   encrypting each of the unencrypted matrices such that $U_i'=KU_iK$.

7. The computer-readable medium of claim 6, wherein the predetermined matrix rank r is 2.

8. The computer-readable medium of claim 6, further comprising:
   receiving the transmitted message matrix E;
   retrieving the second secret matrix K using the received message matrix E and a kept private key matrix C; and
   decrypting the encrypted message using the retrieved second secret matrix K to obtain the message.

9. A cryptographic communication system, comprising:
   a receiver computing platform comprising:
      a processor to generate two matrices A and C of rank r with each matrix element in the integers modulus n such that AC does not equal to CA, wherein n is obtained by using two unique randomly chosen secret prime numbers p and q, wherein r is a matrix rank of the two matrices A and C, wherein the processor generates a matrix B by using the generated matrices A and C such that B≡CAC, wherein the processor further generates a matrix G such that the generated matrix G is in the same multiplicatively commutative subgroup as C, and wherein the processor publishes the generated matrices A, B, G, and n and matrix rank r as the public key, and retains the generated matrix C as the private key;
   a sender coupled to the receiver computing platform through a network comprising:
      an encoder to obtain the published matrices A, B, G, and n and matrix rank r for encrypting a message to be transmitted, wherein the encoder generates a first random secret matrix D that is multiplicatively commutative with the obtained matrix G, wherein the encoder generates a second secret matrix K=DBD using the generated matrices B and D, wherein the encoder generates a message matrix E=DAD using the generated matrices A and D, wherein the encoder obtains a message to be sent securely and encrypts the obtained message using a symmetric-key algorithm by using the generated second secret matrix K as the private key, and wherein the encoder transmits the generated message matrix E along with the encrypted message; and
   a receiver coupled to the sender through the network and further coupled to the receiver computing platform, comprising:
      a decoder to receive the transmitted message matrix E and the encrypted message, wherein the decoder retrieves the second secret matrix K and wherein the decoder decrypts the encrypted message uses the retrieved second secret matrix K with a symmetric-key decryption algorithm to obtain the transmitted message.

10. The system of claim 9, wherein the matrices A, B, C, and G are mathematically described as belonging to a general linear group:

$$GL(r, Z_n)$$

wherein r is the matrix rank, and each matrix element is in the integers modulus n, and where an inverse matrix exists for each matrix in the group, and for which the group is closed under operations of matrix multiplication.

11. The system of claim 9, wherein the matrix rank r is greater than or equal to 2.

12. The system of claim 9, wherein the processor generates the matrix G using the equation: $G \neq C^k$ wherein k is a non-zero, even integer.

* * * * *

UNITED STATES PATENT AND TRADEMARK OFFICE
CERTIFICATE OF CORRECTION

PATENT NO. : 7,346,162 B2  Page 1 of 1
APPLICATION NO. : 11/493199
DATED : March 18, 2008
INVENTOR(S) : Slavin It is certified that error appears in the above-identified patent and that said Letters Patent is hereby corrected as shown below:

In column 16, line 37, in Claim 4, delete "$v_i{\neq}0$" and insert -- $v_i \neq 0$ --, therefor.

In column 18, line 31, in claim 12, delete "$G{\neq}C^{kn}$" and insert -- $G=C^k$ --, therefor.

Signed and Sealed this

Twenty-fourth Day of June, 2008

JON W. DUDAS
*Director of the United States Patent and Trademark Office*